(12) United States Patent
Dewa et al.

(10) Patent No.: US 8,984,573 B2
(45) Date of Patent: Mar. 17, 2015

(54) RECEIVING APPARATUS, DISPLAY CONTROL METHOD, BROADCASTING SYSTEM, AND COMPUTER PROGRAM

(71) Applicant: Sony Corporation, Tokyo (JP)

(72) Inventors: Yoshiharu Dewa, Tokyo (JP); Jun Komatsu, Kanagawa (JP)

(73) Assignee: Sony Corporation (JP)

( * ) Notice: Subject to any disclaimer, the term of this patent is extended or adjusted under 35 U.S.C. 154(b) by 52 days.

(21) Appl. No.: 13/684,923

(22) Filed: Nov. 26, 2012

(65) Prior Publication Data

US 2013/0152127 A1   Jun. 13, 2013

(30) Foreign Application Priority Data

Dec. 7, 2011  (JP) ................. 2011-267679

(51) Int. Cl.
| | | |
|---|---|---|
| H04N 7/173 | (2011.01) | |
| H04N 7/16 | (2011.01) | |
| H04N 21/40 | (2011.01) | |
| H04N 21/00 | (2011.01) | |
| H04N 21/422 | (2011.01) | |
| H04N 21/431 | (2011.01) | |
| H04N 21/434 | (2011.01) | |
| H04N 21/462 | (2011.01) | |
| H04N 21/472 | (2011.01) | |
| H04N 21/61 | (2011.01) | |
| H04N 21/8543 | (2011.01) | |
| H04N 21/858 | (2011.01) | |
| H04N 21/4402 | (2011.01) | |

(52) U.S. Cl.
CPC ............ *H04N 21/40* (2013.01); *H04N 21/00* (2013.01); *H04N 21/4221* (2013.01); *H04N 21/4316* (2013.01); *H04N 21/4348* (2013.01); *H04N 21/4622* (2013.01); *H04N 21/47214* (2013.01); *H04N 21/6125* (2013.01); *H04N 21/8543* (2013.01); *H04N 21/8586* (2013.01); *H04N 21/4345* (2013.01); *H04N 21/440263* (2013.01)
USPC ............................. 725/110; 725/112; 725/135

(58) Field of Classification Search
CPC .......... H04N 21/4221; H04N 21/4316; H04N 21/4345; H04N 21/4622; H04N 21/8586
USPC .................... 725/109, 110, 112, 37, 105, 135
See application file for complete search history.

(56) References Cited

U.S. PATENT DOCUMENTS

| | | | |
|---|---|---|---|
| 7,185,354 B2 * | 2/2007 | Hashimoto | 725/38 |
| 2003/0018979 A1 * | 1/2003 | Hasegawa et al. | 725/126 |
| 2003/0174248 A1 * | 9/2003 | Maruyama | 725/136 |
| 2004/0156620 A1 * | 8/2004 | Horie et al. | 725/58 |
| 2007/0047920 A1 * | 3/2007 | Machida et al. | 386/112 |

(Continued)

FOREIGN PATENT DOCUMENTS

| | | |
|---|---|---|
| JP | 2007-089112 A | 4/2007 |
| JP | 2008-109606 A | 5/2008 |
| JP | 2009-296126 A | 12/2009 |

*Primary Examiner* — Randy Flynn
(74) *Attorney, Agent, or Firm* — Lerner, David, Littenberg, Krumholz & Mentlik, LLP

(57) ABSTRACT

Disclosed herein is a receiving apparatus including: a broadcast reception block; a network connection block; an operation input block; a display block; a broadcast content display block; a network content processing block; a pseudo-data broadcast content processing block configured to process pseudo-data broadcast content having a first designation part and a second designation part, and a data broadcast content processing block.

12 Claims, 12 Drawing Sheets

(56) References Cited

U.S. PATENT DOCUMENTS

2009/0249426 A1* 10/2009 Aoki et al. .................. 725/131
2009/0300696 A1* 12/2009 Dewa .......................... 725/110
2012/0079419 A1* 3/2012 Ajitomi et al. ............... 715/781

* cited by examiner

F I G . 5

```
<?xml version="1.0" encoding="EUC-JP" ?>
<!DOCTYPE bml PUBLIC "+//ARIB STD-B24:1999//DTD BML Document//JA" "bml_1_0.dtd">
<?bml bml-version="1.0" ?>

<bml>
<head>
<title></title>

<script>
<![CDATA[
```

```
function click(){                SCRIPT PART DESCRIBING THE FUNCTION BASED ON OPERATION OF "select" KEY // this function will be called when "select" key pushed // if you want change output field, write like this:
  browser.launchDocument("http://www.broadcast.sony.co.jp/vod_portal.bml");
}
```

```
function dbutton(){              SCRIPT PART DESCRIBING THE FUNCTION BASED ON OPERATION OF d BUTTON // this function will be called when "d" key pushed // if you want change output field, write like this:
  browser.launchDocument("startup2.bml");  // BASE POINT OF ORDINARY DATA BROADCAST CONTENT
}
```

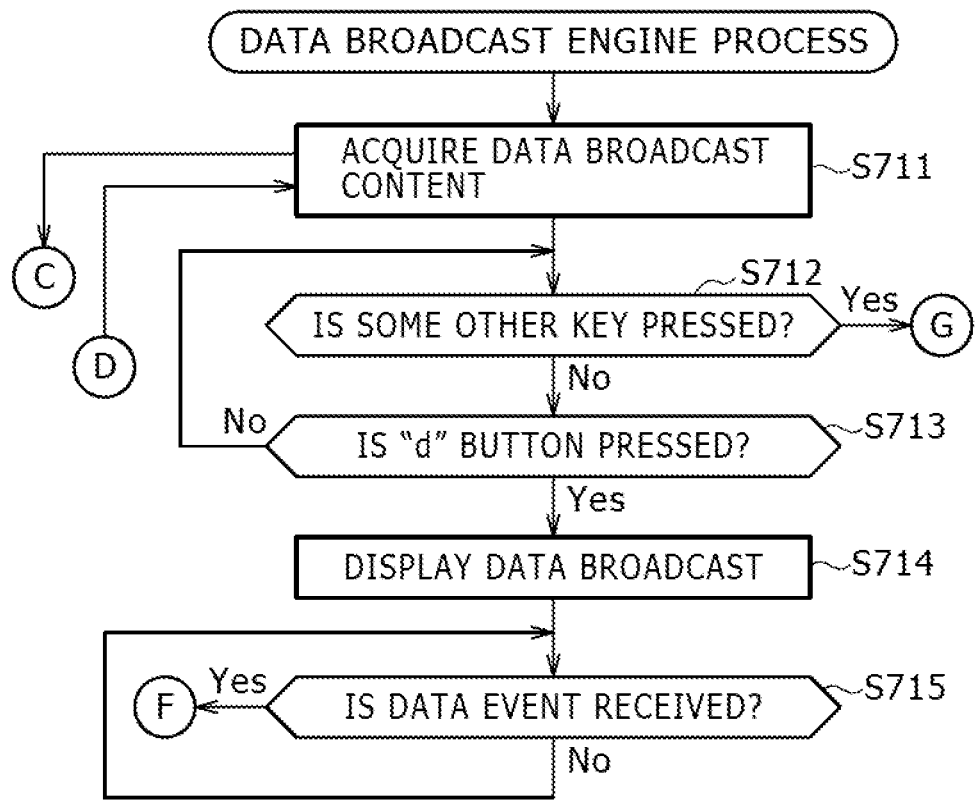

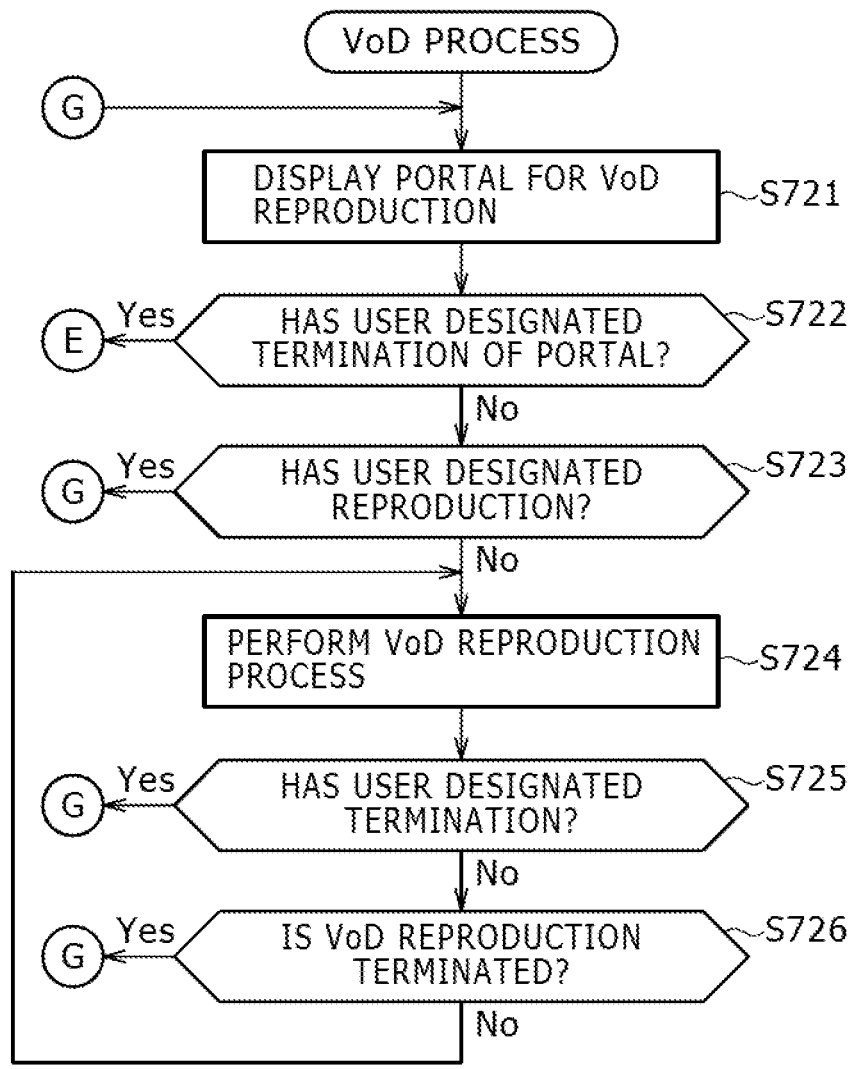

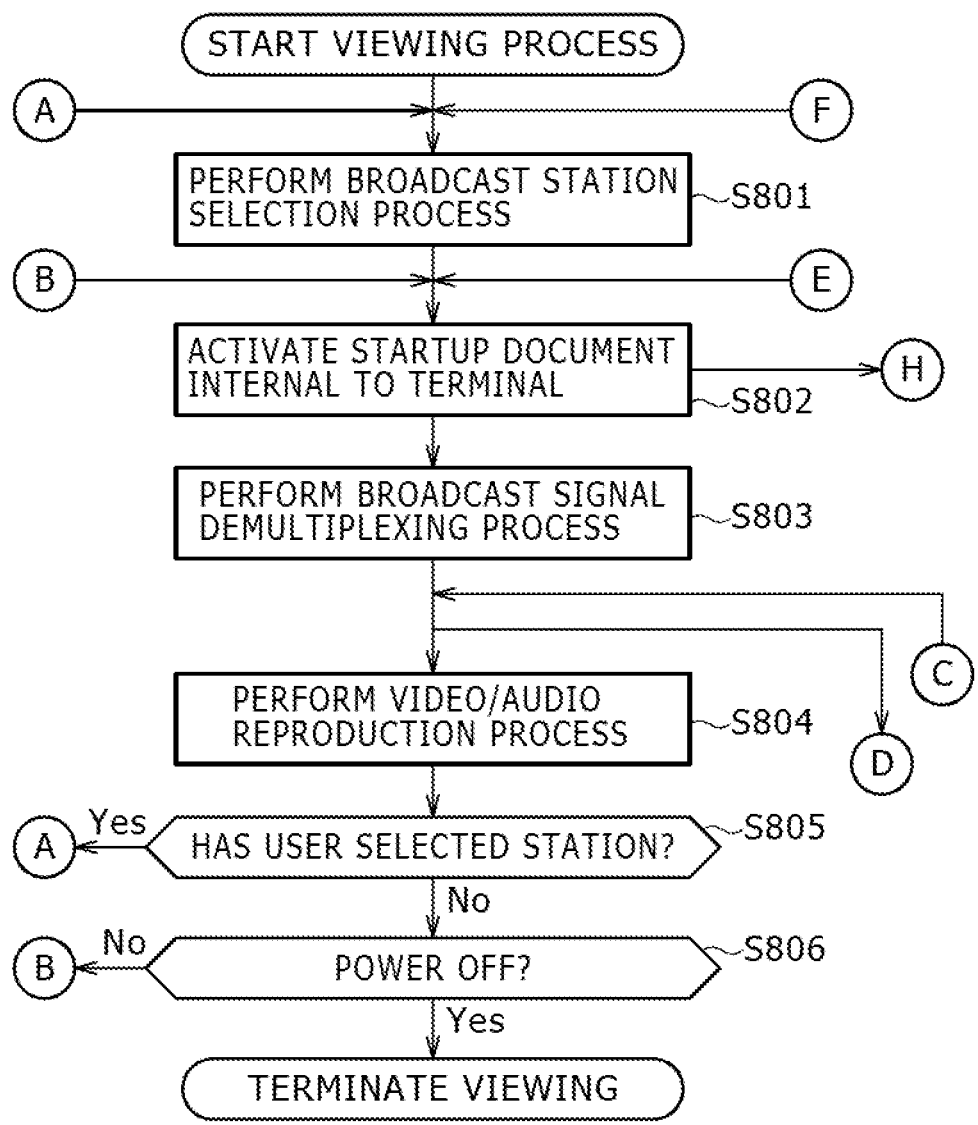

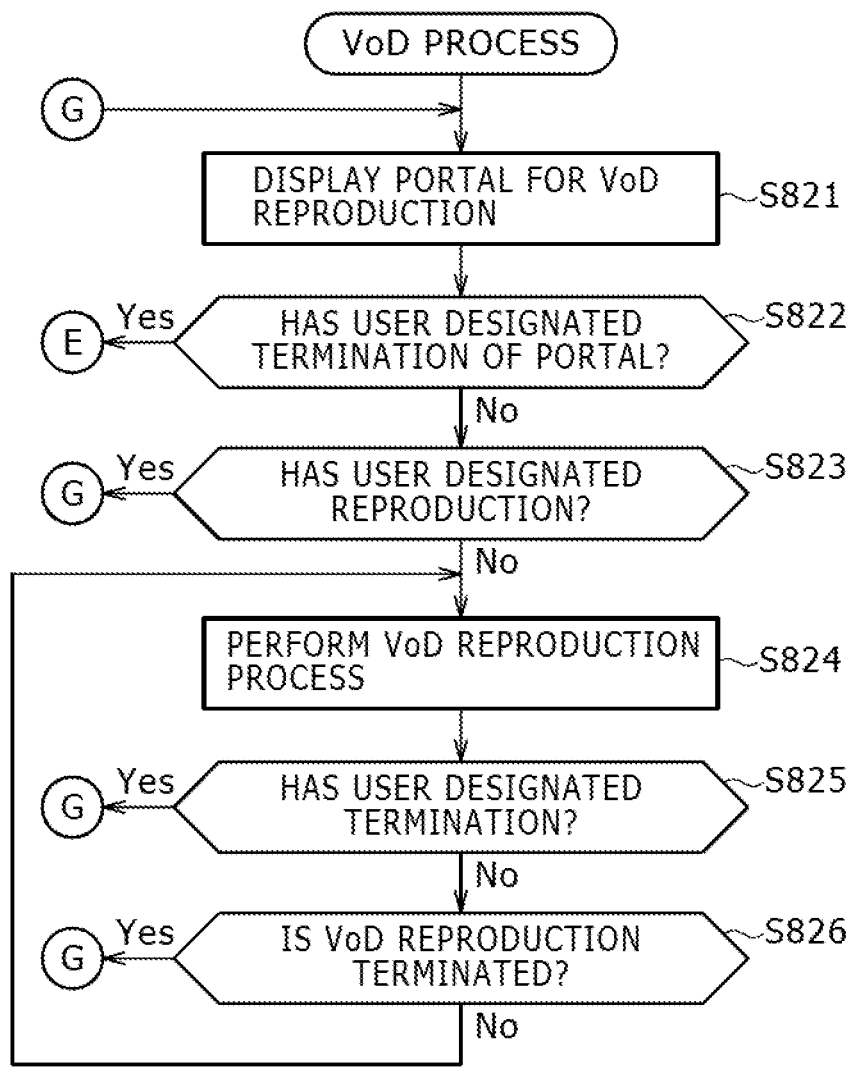

RECEIVING APPARATUS, DISPLAY CONTROL METHOD, BROADCASTING SYSTEM, AND COMPUTER PROGRAM

CROSS-REFERENCE TO RELATED APPLICATION

The present application claims priority from Japanese Patent Application No. JP 2011-267679 filed in the Japanese Patent Office on Dec. 7, 2011, the entire content of which is incorporated herein by reference.

BACKGROUND

The technology disclosed in this specification relates to a receiving apparatus, a display control method, a broadcasting system, and a computer program for receiving broadcast signals and displaying broadcast content. More particularly, the disclosure relates to a receiving apparatus, a display control method, a broadcasting system, and a computer program each utilizing both data broadcast services and network services.

Today, more and more countries are going digital on terrestrial, satellite, and cable broadcast systems. Digital broadcasting provides interactive broadcast services in which data is broadcast concomitantly.

For example, the digital broadcasts based on the ISDB (Integrated Services Digital Broadcasting) system and implemented in Japan offer data broadcasting as one of their features. The broadcasting organizations and other business operators distribute digitally transmitted data (called data broadcast content hereunder) in a manner accompanying broadcast programs proper (called broadcast content hereunder). More specifically, AV content compressed by a suitable compression technology such as MPEG-2 (Moving Picture Experts Group Phase 2) and data broadcast content encoded by an appropriate encoding method such as BML (Broadcast Markup Language) are multiplexed into a transport stream constituting the format in which broadcast signals are distributed. BML was worked out based on XML (eXtensible Markup Language) and provides such functions as the function of designating multimedia data arrangement positions; the function of script execution using ECMA Script, a standard for Java (registered trademark) script; and the XML operation function based on DOM (Document Object Model). Typically, data broadcast content includes such media data as still images, moving images, sounds, graphics, and text. These types of data may be integrated into forms of expression or actions described in documents in BML format.

A data broadcast on TV is started upon operation of a data link button such as a "d" button furnished on a remote controller. (Incidentally, in the U.K., a red color key is used as the data link button.) For example, if the "d" button is operated while a user is viewing a TV program (called the broadcast content hereunder) in a full-screen format, a data broadcast browser for interpreting data broadcast content is started, and transition is made from the full-screen display of the TV broadcast to a data broadcast screen.

The user can designate the manipulations of different media data on the data broadcast screen using color keys (red, green, yellow, blue), cursor keys, an enter key, and numeric keys of the remote controller. The functions corresponding to the operations of these keys can be described in script form in the data broadcast content. For example, there has been proposed an apparatus for generating remote control operation information (e.g., see Japanese Patent Laid-Open No. 2007-89112) which allows the script describing the arrangement information on a link button to be extracted from BML and the arrangement information on the link button to be identified from the extracted script and which converts the arrangement information into remote control operation information that is then encoded.

Generally, the "d" button of the remote controller is used solely to start a data broadcast application and the color keys of the remote controller are used uniquely to perform operations on the data broadcast screen (e.g., for menu selection). Thus if the data broadcast application is not active, nothing occurs when any color key is pressed. If no data broadcast content is being distributed, nothing takes place when the "d" button is pressed. Obviously, it is technically possible to assign the manufacturer's proprietary functions other than those of data broadcasts to the "d" button and color keys. However, once a data broadcast is started, the application functions are kept assigned to the "d" button and color keys, so that assigning the manufacturer's own functions to these keys can be confusing to the user.

Meanwhile, recent years have witnessed the popularization of the so-called Internet TV in conjunction with most communication networks going broadband, the Internet TV being typically a TV set furnished with Internet connection capabilities. Connected to the Internet, the Internet TV permits viewing of video programs offered by services on the Web. The Internet TV is offered programs in two major formats: live streaming, and video-on-demand. Live streaming involves having programs aired in real time, so that the user needs to connect with the service of interest at the time the program is being aired. Video-on-demand allows the program of interest to be viewed in clips at any time desired. For example, there has been proposed an information processing apparatus (see Japanese Patent Laid-Open No. 2008-109606) that allows content such as a movie to be downloaded via the Internet and stored so as to be later reproduced at a desired timing.

If the user wants to use a service on the Internet while viewing a broadcast program (e.g., if it is desired to view a video program in live streaming or on an on-demand basis via the Internet), it is necessary to go through an internal menu of the TV set or the manufacturer's proprietary portal screen. This can be a nuisance: the user cannot make a direct transition from the state in which the broadcast program is being viewed to the desired portal site.

If the same Internet service is to be offered commonly to a plurality of manufacturers' TV sets, it is necessary for each of the portal screens of the respective manufacturers' products to prepare a link menu to the same service site (i.e., transition destination). That is, where Internet services are offered via manufacturers' proprietary portal screens, if the same Internet service is to be provided commonly on all manufacturers' TV sets, a link menu common to the portal screens of their products must be prepared. This is hardly practical.

As another example, there has been proposed a receiving apparatus (see Japanese Patent Laid-Open No. 2009-296126) that permits seamless transition from the state in which broadcast content is displayed to the state in which network content is displayed and vice versa. However, the proposed apparatus can also be troublesome for the user because gaining access to a desired portal site on the Internet requires going through the manufacturer's proprietary portal screen after leaving the state in which a broadcast program is being viewed.

When offering Internet services commonly on different manufacturers' TV sets, the broadcasting organizations need only describe link information in their data broadcast content for a link to their Internet service sites. However, this can also be troublesome for the user because of the need of the transition from the state of full-screen broadcast content display through the data broadcast screen. When starting a service from a newly established portal site, a broadcasting organization must modify the data broadcast content of all broadcast programs so as to add the new link information thereto. The work involved can be inordinately burdensome.

Where a business operator other than the broadcasting organization (e.g., content provider) is to offer Internet services commonly to a plurality of broadcast stations, it is necessary to ask the stations to insert link information for a link to the operator's portal side into their data broadcast content to be distributed by each of the broadcast stations. This can be a very difficult task to accomplish. Obviously, it is unrealistic for any one broadcasting organization taking the initiative in offering Internet services to meddle with the data broadcast content of any other broadcasting organization.

SUMMARY

The present disclosure has been made in view of the above circumstances and provides a receiving apparatus, a display control method, a broadcasting system, and a computer program for advantageously using network services along with data broadcast services.

The present disclosure also provides a receiving apparatus, a display control method, a broadcasting system, and a computer program for advantageously using a network service through seamless transition from the state in which the user is viewing a TV broadcast to the portal site of the network service of interest.

The present disclosure further provides a receiving apparatus, a display control method, a broadcasting system, and a computer program for allowing the user watching a TV broadcast to use advantageously network services commonly on any one of different manufacturers' TV sets or from any one of different broadcast stations.

According to one embodiment of the present disclosure, there is provided a receiving apparatus including: a broadcast reception block configured to receive a broadcast signal in which data broadcast content is multiplexed; a network connection block configured to connect with a network; an operation input block configured to input operations made by a user operating a data link button and other keys or buttons, the data link button designating the linkage of broadcast content with the data broadcast content when operated; a display block; a broadcast content display block configured to display on the display block the broadcast content received by either the broadcast reception block or the network connection block; a network content processing block configured to process network content acquired via the network connection block before displaying the processed network content on the display block; a pseudo-data broadcast content processing block configured to process pseudo-data broadcast content having a first designation part and a second designation part, the first designation part designating activation of the data broadcast content accompanying the broadcast content in response to the operation of the data link button, the second designation part designating transition to a predetermined site on the network in response to the operation of any of the other keys or buttons, and a data broadcast content processing block configured to display a data broadcast screen on the display block by processing the data broadcast content accompanying the broadcast content.

Preferably, the pseudo-data broadcast content may be described in the same description language format as the data broadcast content accompanying the broadcast content.

Preferably, the pseudo-data broadcast content may not include display information. Thus while the pseudo-data broadcast content processing block is processing the pseudo-data broadcast content, the broadcast content display block may keep displaying on the display block the broadcast content being viewed.

Preferably, the pseudo-data broadcast content processing block may process the pseudo-data broadcast content acquired via either the broadcast reception block or the network connection block.

Preferably, the pseudo-data broadcast content processing block may process the pseudo-data broadcast content preinstalled in the receiving apparatus.

Preferably, the pseudo-data broadcast content may be set as a startup document for starting a data broadcast. When the broadcast signal received by the broadcast reception block includes a system descriptor designating automatic activation of the data broadcast, the pseudo-data broadcast content processing block may start the processing of the pseudo-data broadcast content.

According to another embodiment of the present disclosure, there is provided a display control method including: displaying display content that has been received; processing pseudo-data broadcast content having a first designation part and a second designation part, the first designation part designating activation of data broadcast content accompanying broadcast content in response to the operation of a data link button, the second designation part designating transition to a predetermined site on a network in response to the operation of any of other keys or buttons; displaying a data broadcast screen by processing the data broadcast content accompanying the broadcast content in response to the operation of the data link button, and making transition to a portal screen of a predetermined site on the network in response to the operation of any of the other keys or buttons.

According to a further embodiment of the present disclosure, there is provided a broadcasting system including a broadcast station and a receiving station, the broadcast station broadcasting a broadcast signal in which data broadcast content is multiplexed, the receiving station receiving the broadcast signal. The receiving station acquires pseudo-data broadcast content having a first designation part and a second designation part, the first designation part designating activation of the data broadcast content accompanying broadcast content in response to the operation of a data link button, the second designation part designating transition to a predetermined site on a network in response to the operation of any of other keys or buttons. The receiving station starts processing of the pseudo-data broadcast content when the broadcast station starts a data broadcast. In response to the operation of the data link button, the receiving station displays a data broadcast screen by processing the data broadcast content accompanying the broadcast content. And in response to the operation of any of the other keys or buttons, the receiving station makes transition to a portal screen of a predetermined site on the network.

In this context, the term "system" refers to a logical configuration of a plurality of devices (or functional modules each bringing about a specific function). The devices or functional modules may or may not be housed in a single enclosure.

According to an even further embodiment of the present disclosure, there is provided a computer program described in a computer-readable format for causing a computer to function as an apparatus including: a broadcast reception block configured to receive a broadcast signal in which data broadcast content is multiplexed; a network connection block configured to connect with a network; an operation input block configured to input operations made by a user operating a data link button and other keys or buttons, the data link button designating the linkage of broadcast content with the data broadcast content when operated; a display block; a broadcast content display block configured to display on the display block the broadcast content received by either the broadcast reception block or the network connection block; a network content processing block configured to process network content acquired via the network connection block before displaying the processed network content on the display block; a pseudo-data broadcast content processing block configured to process pseudo-data broadcast content having a first designation part and a second designation part, the first designation part designating activation of the data broadcast content accompanying the broadcast content in response to the operation of the data link button, the second designation part designating transition to a predetermined site on the network in response to the operation of any of the other keys or buttons, and a data broadcast content processing block configured to display a data broadcast screen on the display block by processing the data broadcast content accompanying the broadcast content.

The computer program outlined in the preceding paragraph is defined as a computer program described in a computer-readable format for causing a computer to perform a predetermined process. In other words, installing the above-outlined computer program into a computer allows the latter to provide collaborative functions equivalent to the functions of the receiving apparatus outlined earlier.

The technology disclosed in this specification thus provides a receiving apparatus, a display control method, a broadcasting system, and a computer program for advantageously using a network service through seamless transition from the state in which the user is viewing a TV broadcast to the portal site of the network service of interest.

Also according to the technology disclosed in this specification, the pseudo-data broadcast content does not include screen display information. Thus when activated as a startup document, the pseudo-data broadcast content lets the currently viewed TV broadcast be displayed full-screen. The pseudo-data broadcast content includes descriptions of two transitions: transition to the original data broadcast content, carried out in response to the operation of the data link button; and transition to a predetermined service site, performed in response to the operation of any of the other keys or buttons. Thus while viewing a TV broadcast, the user can use an ordinary data broadcast screen by operating the data link button; the user will not experience any confusion as a result. On the other hand, by operating a color key or some other button than the data link button, the user can make direct transition from the TV broadcast display screen to a portal screen of an Internet service. That is, while viewing a TV program, the user can make direct transition to the portal screen of the desired Internet service without passing through the menu screen or the like specific to the TV set in use; the user can utilize Internet services seamlessly from viewing the TV program.

Also according to the technology disclosed in this specification, the link information for linkage to service sites is designated not through the menu screen specific to the TV set but by the pseudo-data broadcast content. This makes it possible to implement an Internet service commonly on any one of the TV sets from a plurality of manufacturers. When the pseudo-data broadcast content is offered to multiple broadcast programs and to multiple broadcast stations, an Internet service common to the TV programs as well as to the broadcast stations can be implemented.

Further objects and advantages of the present disclosure will become apparent upon a reading of the following description and appended drawings.

BRIEF DESCRIPTION OF THE DRAWINGS

FIG. 5 is a schematic view showing a typical source code of pseudo-data broadcast content;

FIG. 7B is a flowchart showing another procedure (data broadcast process) performed by the receiving terminal when using the data broadcast service (when the pseudo-data broadcast content serving as the startup document is received as part of the data broadcast);

FIG. 7C is a flowchart showing another procedure (VoD process) performed by the receiving terminal when using the data broadcast service (when the pseudo-data broadcast content serving as the startup document is received as part of the data broadcast);

FIG. 8A is a flowchart showing another procedure (viewing process) performed by the receiving terminal when using the data broadcast service (when the pseudo-data broadcast content serving as the startup document is preinstalled in the receiving terminal);

FIG. 8C is a flowchart showing another procedure (VoD process) performed by the receiving terminal when using the data broadcast service (when the pseudo-data broadcast content serving as the startup document is preinstalled in the receiving terminal).

DETAILED DESCRIPTION OF THE PREFERRED EMBODIMENTS

Some preferred embodiments of the technology disclosed in this specification will now be described in detail by reference to the accompanying drawings.

Figure 1:
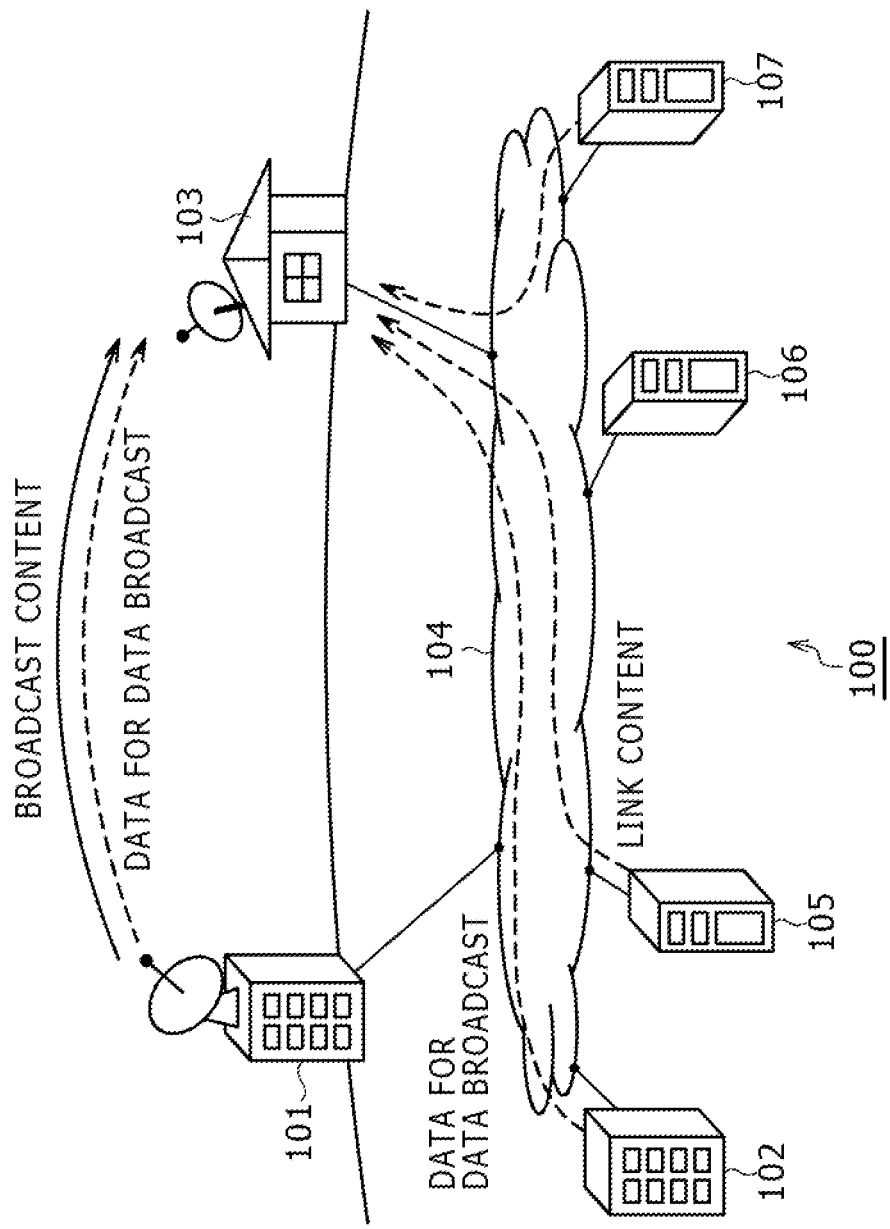
FIG. 1 is a schematic view showing the configuration of a broadcasting system to which the technology disclosed in this specification is applied.

FIG. 1 schematically shows the configuration of a broadcasting system 100 to which the technology disclosed in this specification is applied.

The broadcasting organization that distributes broadcast content has its broadcast station 101 broadcast to receiving stations, on airwaves, a broadcast signal carrying broadcast programs proper and data broadcast content accompanying the broadcast programs. The broadcast signal is not limited to ground waves; it can also be distributed as a satellite wave by way of a broadcast satellite (not shown) or delivered over cable TV networks.

Alternatively, the broadcasting organizations and other business operators may distribute to the receiving stations the data broadcast content accompanying broadcast programs not on airwaves but via networks from data broadcast servers 102.

Although FIG. 1 shows only one receiving station, in practice there exist countless receiving stations on the ground for receiving the broadcast signal. In this context, the receiving station refers to a receiving terminal 103 such as a TV set installed in each household. The receiving terminal 103 has its back channel connected to a broadband network such as the Internet 104, so that the terminal may acquire network content as video on demand or in live streaming, for example.

On the Internet 104, there exist diverse servers besides the above-mentioned data broadcast servers 102. Among these servers are content servers 105 that offer linked content inserted into the data broadcast content accompanying broadcast programs, the linked content being provided through a data broadcast screen.

Meanwhile, it is not realistic to have the link information of a newly established content server 106 inserted successively into the existing data broadcast content. It is also unrealistic, given link information for linkage to the service sites offered by servers 107 run by business operators other than the broadcasting organization, to insert such link information into the data broadcast content accompanying the broadcast programs distributed by the broadcast stations. Some of the servers 107 offer Internet services in a manner common to the terminal products of different manufacturers and to different broadcasting organizations and different broadcast programs distributed by the broadcast stations. One such Internet service common to the terminal product manufacturers and the broadcast stations is video-on-demand.

It is assumed that the broadcasting system 100 in FIG. 1 uses MPEG-2 for encoding its broadcast signal. It is also assumed that MPEG2-TS (Transport Stream) is used for multiplexing data streams in view of the possibility that the broadcast systems and communication networks for use therewith may be utilized in an environment prone to data transmission errors.

In MPEG-2 TS format, a plurality of fixed-length TS packets each measuring 188 bytes long are combined to make up a transport stream. The 188-byte length of each TS packet is determined so as to ensure consistency with the length of ATM (Asynchronous Transfer Mode) cells. Each TS packet is made up of a four-byte-long (fixed length) packet header, a variable-length adaptation field, and a payload. The packet header has a PID (packet identifier) and various flags defined therein. The PID identifies the type of each TS packet.

Furthermore, the transport stream includes packets of information (system descriptor) described in sections that contain PSI (Program Specific Information) and SI (Service Information) in the form of tables.

The PSI is the information necessary for the system to receive selectively the channel of a desired broadcast (i.e., control information for channel selection). As such, the PSI has such sections as PAT (Program Association Table), PMT (Program Map Table), NIT (Network Information Table), and CAT (Conditional Access Table). The PAT describes the PID of the PMT corresponding to a program number, among others. The PMT describes the PID of the video data, audio data, additional data, and PCR included in the corresponding program. The NIT describes detailed information about the broadcasting system as a whole, such as information about all programs included in the network and information about the carrier frequency in which the target program is transmitted. The CAT describes individualized information such as identification of the conditional access system and contract information.

The SI constitutes sections for use by broadcast organizations. The SI includes such sections as EIT (Event Information Table) and SDT (Service Description Table). The EIT describes detailed information and broadcast time information about programs. By processing these sections, the receiving terminal may display an electronic program guide (EPG) and reserve broadcast programs for unattended recording.

Figure 2:
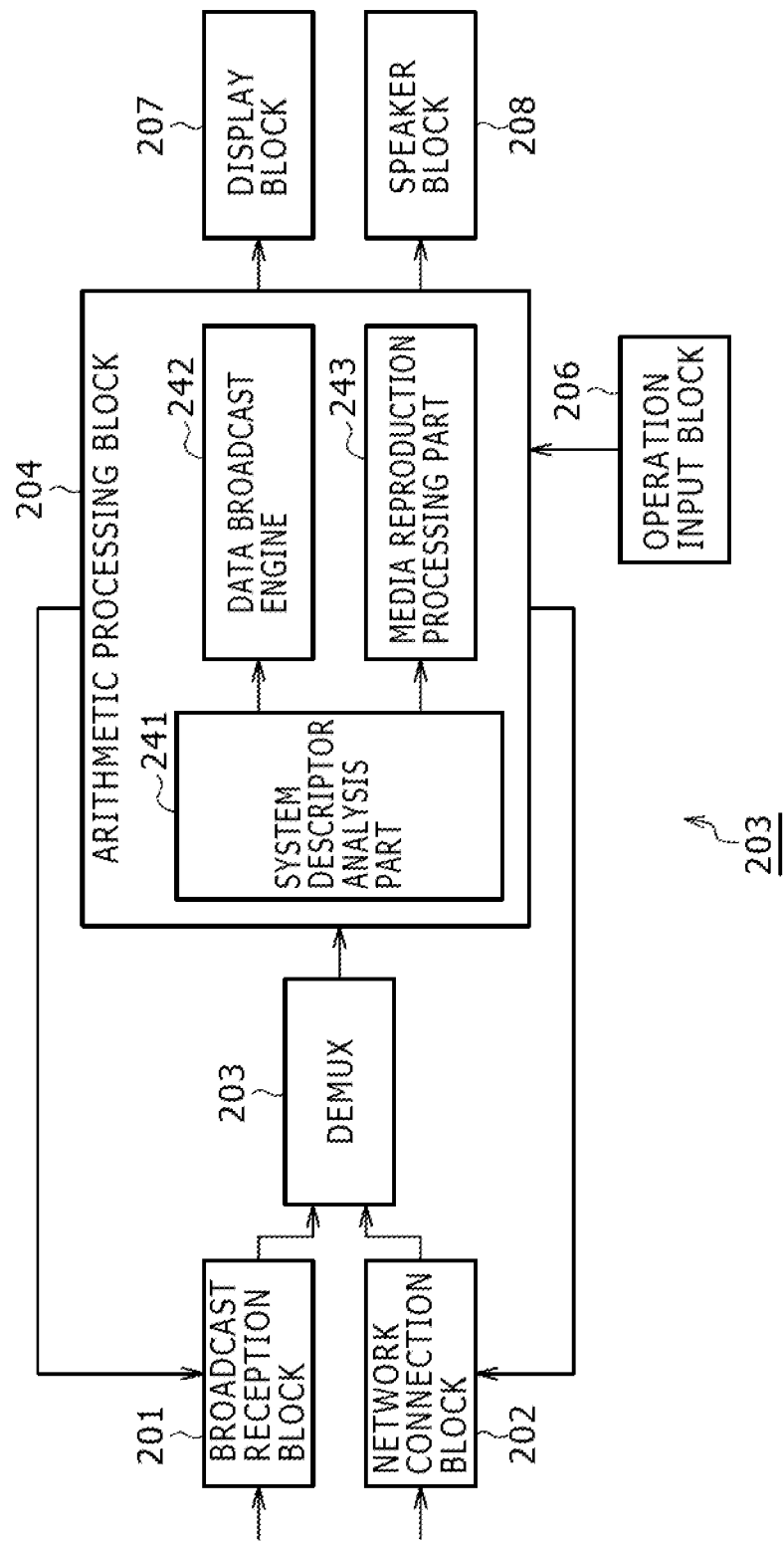
FIG. 2 is a block diagram showing an internal structure of a receiving terminal.

FIG. 2 shows an internal structure of the receiving terminal 103. The receiving terminal 103 reproduces or otherwise processes the broadcast content distributed by the broadcasting organizations and the AV content and application data (e.g., data broadcast content described in BML) provided by content providers or the like, following reception in the form of broadcast waves from the broadcast stations 101 or of transmissions over the Internet 104. The receiving terminal 103 typically corresponds to such equipment as a TV set, a personal computer, or a mobile phone.

The receiving terminal 103 includes a broadcast reception block 201, a network connection block 202, a demultiplexer (DEMUX) 203, an arithmetic processing block 204, an operation input block 206, a display block 207, and a speaker block 208.

The broadcast reception block 201 receives the broadcast signal distributed by the broadcast station 101. The broadcast signal is composed of a transport stream in which broadcast content and data broadcast content are multiplexed. The network connection block 202 handles connections to the Internet 104 for access to the data broadcast server 102 and other servers in order to receive AV content and data broadcast content therefrom.

The demultiplexer 203 demultiplexes the transport stream received by the broadcast reception block 201 and network connection block 202 into video data, audio data, data broadcast content, etc., that were present individually before being multiplexed.

The arithmetic processing block 204 is made up of a CPU (central processing unit), a main memory, and a ROM (read only memory), all not shown. The CPU loads software programs from the ROM into the main memory and executes the loaded programs.

The functions that may be implemented by the CPU executing the software programs held in the ROM include a system descriptor analysis part 241, a data broadcast engine 242, and a media reproduction processing part 243.

The data broadcast engine 242 has the capabilities of a BML browser and an HTML browser, analyzes the data broadcast content and network content received by the broadcast reception block 201 and network connection block 202, and performs the process of displaying a data broadcast screen and a browser display screen.

The media reproduction processing part 243 has the capability of a media player, and performs the process of reproducing the broadcast content and AV content in MPEG-2 format received by the broadcast reception block 201 and network connection block 202.

The system descriptor analysis part 241 analyzes the system descriptor (mentioned above) included in the transport stream received by the broadcast reception block 201 and network connection block 202, and controls activation, deactivation, and other operations of the data broadcast engine 242 and media reproduction processing part 243 accordingly.

The display block 207 displays images and documents (BML content and XML content) processed by the data broadcast engine 242, and displays the video signal of the AV content reproduced by the media reproduction processing part 243. The speaker block 208 outputs the audio signal of the AV content reproduced by the media reproduction processing part 243, for example.

The operation input block 206 includes a key operation block and a remote control signal reception block (both not shown) furnished on the main body of the receiving terminal 103. The operation input block 206 accepts the input operations made by the user and notifies the arithmetic processing block 204 thereof.

Figure 3:
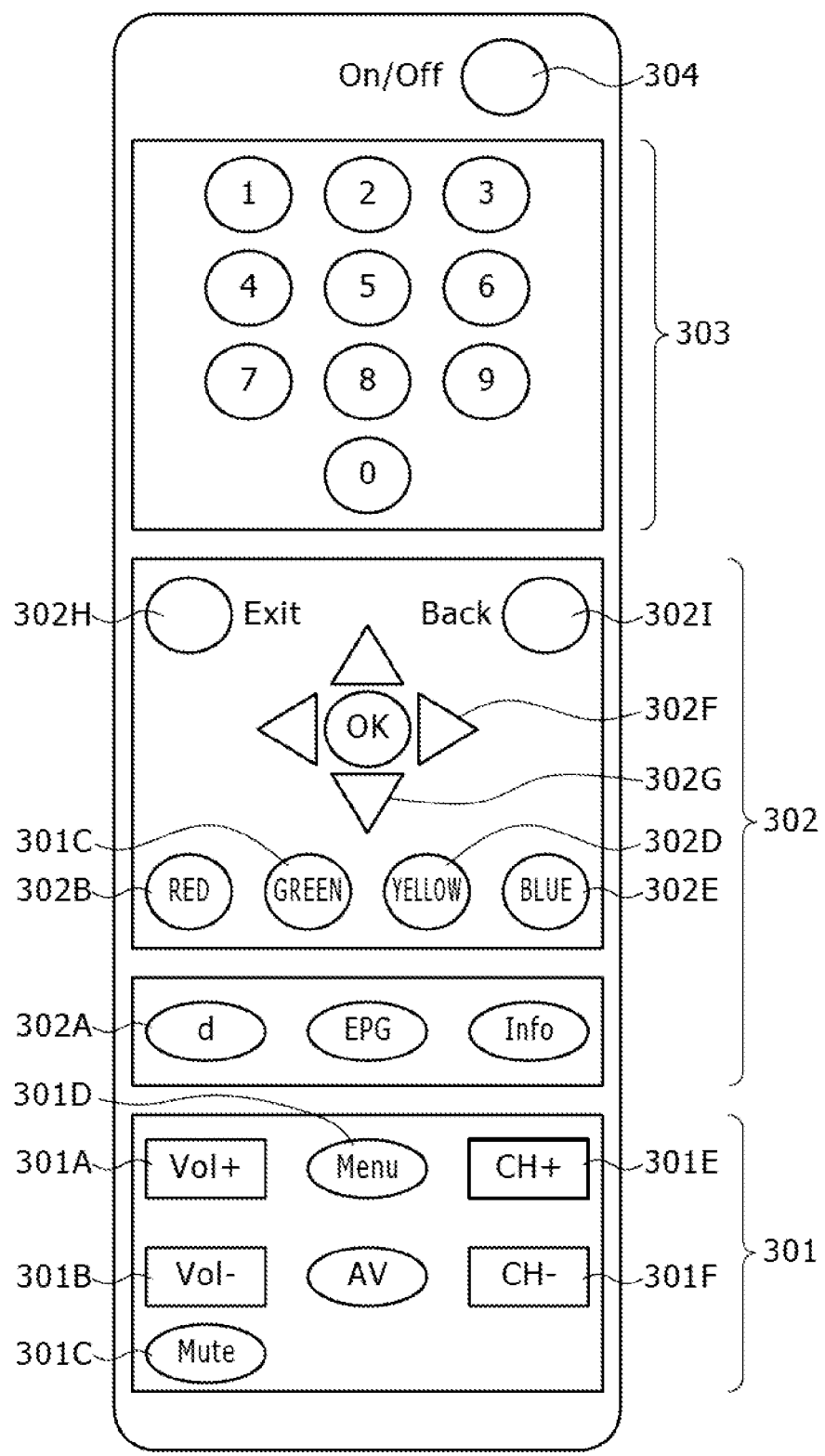
FIG. 3 is a schematic view showing a typical button layout on the operating panel of a remote controller capable of remotely controlling the receiving terminal.

With this embodiment, the receiving terminal 103 is assumed to be a digital TV set equipped with an Internet connection function. FIG. 3 shows a typical button layout on the operating panel of a remote controller capable of remotely controlling the receiving terminal 103. The operating panel of the remote controller in FIG. 3 includes a TV set key area 301, a data broadcast key area 302, a numeric key area 303, and a power on/off button 304.

The TV set key area 301 has a "Vol+" button 301A and a "Vol–" button 301B for sound volume control, a "CH+" button 301C and a "CH–" button 301D for channel selection, a "Menu" button 301E, and a "Mute" button 301F laid out.

The data broadcast key area 302 is furnished with a "d" button 302A for data linkage, color keys 302B through 302E (red, green, yellow, blue), cursor keys 302F, an enter key 302G, an "Exit" button 302H for designating the end of data linkage (data broadcast screen), and a "Back" button 302I for designating the transition to the immediately preceding screen.

The numeric key area 303 has alphanumeric keys 0 through 9 laid out.

Basically, the keys in the TV set key area 301 are used solely to make operations for viewing TV broadcast programs, and the keys in the data broadcast key area 302 are used solely to perform manipulations on the data broadcast screen. The keys in the numeric key area 303 are used commonly to carry out operations both for viewing TV broadcast programs and for manipulating the data broadcast screen. Incidentally, the receiving terminal manufacturers' proprietary functions are not assigned to the data broadcast keys.

The functions corresponding to the operations of the keys in the data broadcast key area 302 are described in script format in the data broadcast content. Thus if remote control signals are received in response to the operations of keys in the data broadcast key area 302 during activation of a data broadcast application, the data broadcast engine 242 performs data events in accordance with the description of the script and thereby controls manipulations on the data broadcast screen.

Figure 4:
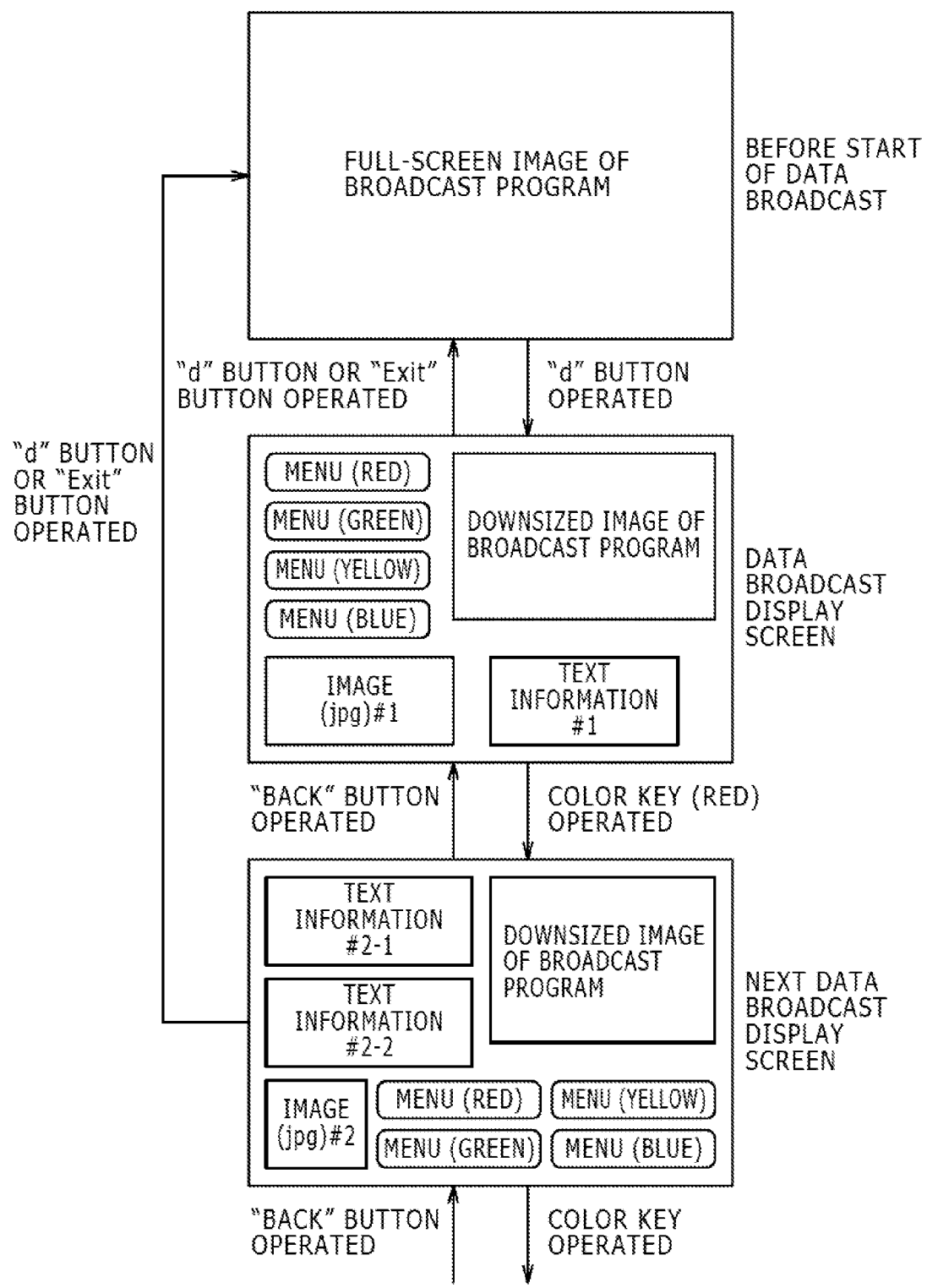
FIG. 4 is a schematic view showing typical screen transitions triggered in response to remote controller operations on a TV set when a data broadcast service is used.

FIG. 4 shows typical screen transitions triggered in response to the remote controller operations performed on the receiving terminal 103 when a data broadcast service is being used.

Before the start of a data broadcast, the display block 207 displays a full-screen image of the broadcast program being viewed (i.e., selected). When the data broadcast is started at this point by operation of the "d" button, a transition is made to a data broadcast screen. In the example of FIG. 4, the image area of the broadcast program within the data broadcast screen is reduced to the size stipulated in the data broadcast content. The data broadcast screen also displays such media data as text information and images contained in the media broadcast content.

The data broadcast screen contains at least one menu button. Each menu may be selected by operation of, say, color keys on the remote controller. In the example of FIG. 4, pressing the red color key triggers transition to the next data broadcast screen. On this screen, the image area of the broadcast program is also downsized.

With the data broadcast being displayed, pressing the "d" button (or "Exit" button) terminates the data broadcasts and restores a full-screen image of the original broadcast program. Also with the data broadcast being displayed, pressing the "Back" button triggers transition to the immediately preceding data broadcast screen.

Although not shown, pressing the "Menu" button before the start of a data broadcast performs transition to the menu screen provided by the currently used receiving terminal or to the terminal manufacturer's proprietary portal screen.

In general, the "d" button on the remote controller is used solely for starting a data broadcast application, and the color keys on the remote controller are used solely for performing manipulations on the data broadcast screen (e.g., for menu selection). For example, it might be possible to assign other functions to the "d" button and to the color buttons by changing script descriptions in the data broadcast content. However, such practice may well be confusing to the user (as discussed above). Thus for this embodiment, it is assumed that the keys within the data broadcast key area 302 are assigned solely data broadcast functions and not any other functions unique to the manufacturer of the receiving terminal 103. Consequently, when the data broadcast application is running, nothing occurs even if any of the color keys is pressed. Where no data broadcast content is distributed, nothing takes places even if the "d" button is pressed.

When equipped with the Internet connection function, the receiving terminal 103 can receive both data broadcast services and network services. With an ordinary receiving terminal, however, if a user currently having a TV broadcast displayed full-screen wants to use an Internet service such as video-on-demand, it is necessary to access the service by way of a menu screen prepared in the receiving terminal 103 or through a proprietary portal screen of the terminal manufacturer. That is, the user cannot make a direct transition to the desired service site such as a VoD portal from the full-screen image display of the currently viewed broadcast program; that can be troublesome to the user. Where Internet services are offered via a proprietary portal screen of each terminal manufacturer, it is unrealistic to provide the same Internet services in a manner common to a plurality of terminal manufacturers.

Alternatively, Internet services may be offered to the receiving terminal 103 via the data broadcast service. In this case, the receiving terminal 103 needs to perform transition to the data broadcast screen before gaining access to a desired service site. This is exactly the same as with the case above in which the direct transition to the desired service site is not available starting from the full-screen display of the broadcast program on the display block 207. To get an Internet service offered in all broadcast programs requires making the modification of inserting link information into the data broadcast content of every broadcast program. This can amount to an inordinate work burden on the broadcasting organizations. If it is desired to offer Internet services in a manner common to a plurality of broadcast stations, each broadcasting organization needs to insert common link information into its data broadcast content. This is also an unrealistic goal.

According to the technology disclosed in this specification, a set of content in the same BML format as the data broadcast content is used to supply the receiving terminal 103 with link information for linkage to service sites. This feature aims at implementing Internet services in a manner independent of terminal manufacturers' proprietary menu screens and common to their products. The BML content offering the link information for linkage to the service site will be called "pseudo-data broadcast content" hereunder to make a distinction from the original data broadcast content accompanying broadcast programs.

The pseudo-data broadcast content is described in BML. Thus the receiving terminal 103 can process the pseudo-data broadcast content in the same manner as the original data broadcast content by resorting to an ordinary data broadcast processing function (i.e., data broadcast engine 242).

The pseudo-data broadcast content, it should be noted, is a BML-format file that does not include such visual media data as still images, moving images, graphics or text, and describes nothing about the format in which the data broadcast screen is represented. Thus when the pseudo-data broadcast content is started, the currently viewed broadcast program is in full-screen display mode; the user remains unaware of the pseudo-data broadcast content getting started. The pseudo-data broadcast content may be said to be a "transparent" data broadcast since it is not displayed on the screen.

The pseudo-data broadcast content includes a script that describes the functions of the receiving terminal 103 to be performed in response to the button and key operations on the remote controller. Specifically, what is described in the script is twofold: (1) operating the "d" button of the remote controller starts the data broadcast content that should originally be carried out as a data broadcast; and (2) operating a color key or the like other than the "d" button makes transition to a predetermined service site.

The pseudo-data broadcast content may be offered to the receiving terminal 103 in any suitable way. As with the original data broadcast content, the pseudo-data broadcast content may be distributed from the broadcast station 101 in a manner accompanying the broadcast content. Alternatively, the pseudo-data broadcast content may be distributed via transmission media such as the Internet 104 other than broadcasts. As another alternative, the data constituting the pseudo-data broadcast content may be preinstalled in, say, the ROM of the arithmetic processing block 204 inside the receiving terminal 103.

If the broadcast signal received selectively by the receiving terminal 103 contains a data broadcast, the pseudo-data broadcast content is automatically started on the terminal 103. Under the broadcasting standards in Japan, setting an "autostart_flag" flag in the above-mentioned PMT (a system descriptor of the broadcast signal) causes the data broadcast content to be automatically started simultaneously with the start of a data broadcast. When the system descriptor analysis part 241 detects that the "autostart_flag" flag is being set while analyzing the PMT and other system descriptors, the system descriptor analysis part 241 instructs the data broadcast engine 242 to analyze the data broadcast content, i.e., to start the data broadcast. The top page in effect when the data broadcast content is started (i.e., startup document) is stipulated to have the file name "startup.bml." Thus the file name of the pseudo-data broadcast content is set to "startup.bml" replacing the startup document of the original data broadcast content. At the same time, the file name of the startup document for the original data broadcast content is changed to something else (e.g., "startup2.bml"). Then when the data broadcast is started, the data broadcast engine 242 handles the pseudo-data broadcast content as the startup document and causes it to start automatically.

Obviously, the technology disclosed in this specification is not limited to automatically starting the pseudo-data broadcast content as the startup document. Alternatively, the pseudo-data broadcast content may be offered not on airwaves but in a manner preinstalled in the receiving terminal 103. In such a case, the pseudo-data broadcast content may be forcibly started by the user's operation.

FIG. 5 schematically shows a typical source code of the pseudo-data broadcast content. As indicated in FIG. 5, the pseudo-data broadcast content includes two script parts: a script part that describes the function of the receiving terminal 103 performed when the "select" key is operated on the remote controller, and a script part that describes the function of the receiving terminal 103 carried out when the "d" button is operated on the remote controller.

The former script part describes the transition to be made to a predetermined service site ("http://www.broadcast.sony.co.jp/vod_portal.bml") when the "select" key is operated. The "select" key in this case is any one of the keys, such as the color keys, except the "d" button on the remote controller. The latter script part describes the transition to be made to the base point of the data broadcast content (top page "startup2.bml") that should be executed as the original data broadcast when the "d" button is operated on the remote controller.

Except for the above-described script parts, the source code of the pseudo-data broadcast content in FIG. 5 does not include such display information as still images, moving images, graphics or text, or descriptions of the format in which the data broadcast screen is to be represented. Thus the pseudo-data broadcast content constitutes a transparent data broadcast screen, so that the broadcast program currently displayed on the display block 207 remains in full-screen display mode.

Figure 6:
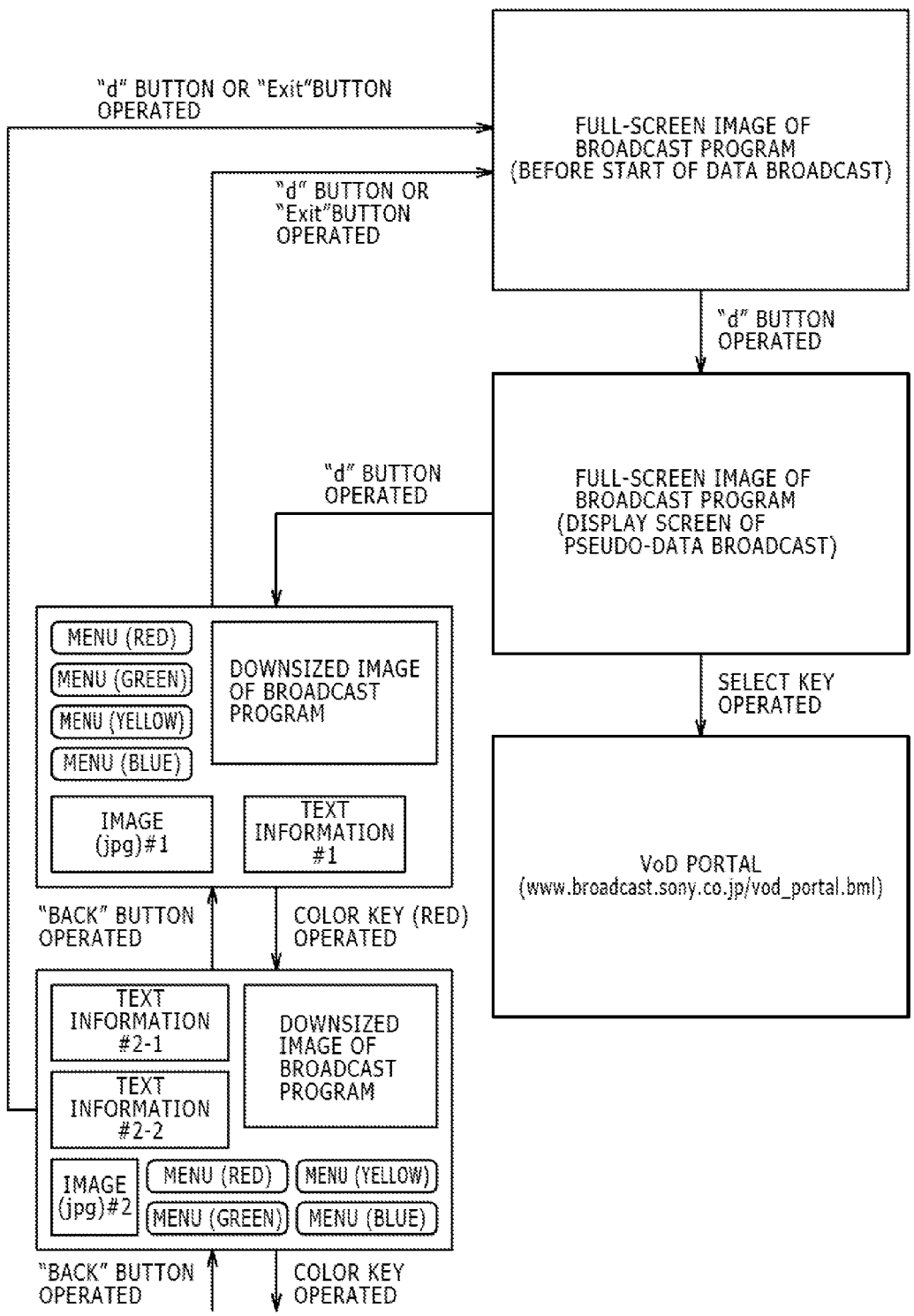
FIG. 6 is a schematic view showing typical screen transitions triggered in response to remote controller operations on the receiving terminal when pseudo-data broadcast content is used as a startup document.

FIG. 6 schematically shows typical screen transitions triggered in response to remote controller operations on the receiving terminal 103 when the pseudo-data broadcast content is used as a startup document.

Before the start of a data broadcast, the image of the currently viewed broadcast program (i.e., selected channel) is in full-screen display.

When the data broadcast is started, the pseudo-data broadcast content having the file name "startup.bml" is started as the startup document. Alternatively, the pseudo-data broadcast content may be forcibly started by the user's operation. Since the pseudo-data broadcast content constitutes a "transparent" data broadcast with no description about the format in which the display screen is to be represented, the full-screen display of the broadcast program remains intact following the startup.

When the "d" button of the remote controller is operated with the pseudo-data broadcast content screen in effect, a data event "data_button_pressed" is issued. When this data event occurs, transition is made to the base point of the data broadcast content (top page "startup2.bml") that should be executed as the original data broadcast. What takes place following the transition to the original data broadcast screen was discussed above in reference to FIG. 4 and thus will not be explained further.

On the other hand, if the "select" button of the remote controller is pressed with the pseudo-data broadcast content screen in effect, transition is made to the portal screen of a predetermined service site such as a VoD portal ("http://broadcast.sony.co.jp/vod_portal.bml").

In the example of FIG. 6 showing screen transitions, pressing the "d" button with the pseudo-data broadcast content having been started triggers transition from the full-screen display of the broadcast program to the original data broadcast screen. Thus as in the example of FIG. 4 also showing screen transitions, pressing the "d" button appears to start the data broadcast in like manner from the user's point of view. In this case, the user will not experience confusion. When the "select" key is pressed, transition is performed from the full-screen display of the broadcast program to the portal screen of the service site. For the user, it appears as if pressing a color key or some other button of the remote controller simply triggers transition to the portal screen.

Since there exist a plurality of color keys on the remote controller as shown in FIG. 3, each of the different color keys may be arranged to call up a particular broadcast station when operated. Some of the keys may be arranged to trigger transition to service sites that list solely special content items when operated. As another alternative, the different color keys may be arranged to trigger transition to different types of data broadcast content when operated.

Given that the pseudo-data broadcast content does not constitute any terminal manufacturer's proprietary menu screen, it is possible to implement the transition to service sites common to different terminal manufacturers. When the pseudo-data broadcast content is not made specific to any particular broadcast program or broadcasting organization, it is possible to implement the transition to service sites common to different broadcast programs and different broadcast stations.

On the usual data broadcast screen, the image of the broadcast program is downsized as shown in FIG. 4. By contrast, the pseudo-data broadcast screen is a "transparent" display screen as shown in FIG. 6, so that the display block 207 displays the broadcast program full-screen. Thus when the pseudo-data broadcast content is replaced with the startup document of the data broadcast, operating a button or key other than the "d" button on the remote controller is experienced as apparently triggering a direct transition from the screen of the currently viewed TV program to the portal screen of an Internet service. This allows the user to utilize the Internet service seamlessly from viewing the TV program.

Figure 7A:
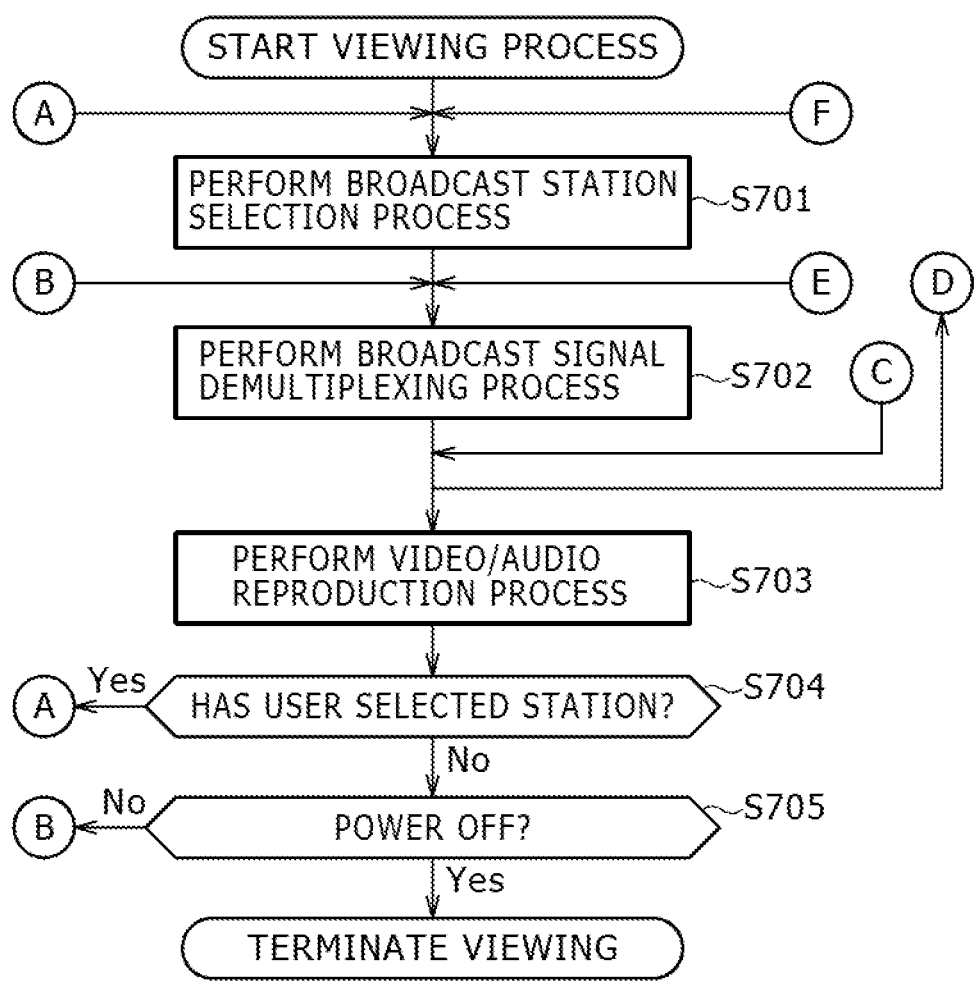
FIG. 7A is a flowchart showing a procedure (viewing process) performed by the receiving terminal when using the data broadcast service (when the pseudo-data broadcast content serving as the startup document is received as part of the data broadcast)

FIGS. 7A through 7C show, in the form of flowcharts, the procedures to be carried out by the receiving terminal 103 when the data broadcast service is used. In these examples, the pseudo-data broadcast content serving as the startup document is assumed to be received as part of the data broadcast.

When the user starts viewing a TV program on the receiving terminal 103, the broadcast reception block 201 performs a channel selection process (step S701). The demultiplexer 203 demultiplexes the multiplexed broadcast signal (step S702). The media reproduction processing part 243 performs the process of reproducing the video and audio signals demultiplexed in step S702. This causes the display block 207 to display the resulting image on the screen and the speaker block 208 to output sounds (step S703).

At this point, if the user selects another channel by operating the channel buttons (CH+, CH−) on the remote controller ("Yes" in step S704), for example, step S701 is reached again and the broadcast reception block 201 again performs the channel selection process.

Steps S701 through S704 explained above are repeated until the receiving terminal 103 is powered off ("No" in step S705).

The system descriptor analysis part 241 analyzes the PMT and other system descriptors included in the broadcast signal demultiplexed in step S702. If it is detected that the "autostart_flag" flag is set in the PMT, the system descriptor analysis part 241 instructs the data broadcast engine 242 to start the startup document.

The data broadcast engine 242 acquires the startup document having the file name "startup.bml" from the data broadcast following the demultiplexing of the broadcast signal in step S702 (step S711), and starts the acquired startup document.

The startup document acquired from the data broadcast constitutes pseudo-data broadcast content. As discussed above, what the pseudo-data broadcast content describes in script form regarding the function of the receiving terminal 103 triggered by remote controller operations is twofold: (1) operating the "d" button of the remote controller starts the data broadcast content that should originally be carried out as a data broadcast; and (2) operating a color key or the like other than the "d" button makes transition to a predetermined service site. Since the pseudo-data broadcast content is "transparent" BML content with no description about the format in which the data broadcast screen is to be represented, the full-screen display of the broadcast program reproduced and output in step S703 remains intact following the startup.

If the "select" button is operated on the remote controller ("Yes" in step S712), transition is made to the portal screen of a predetermined service site about which the link information is described in the pseudo-data broadcast content. In this case, it is assumed that transition is performed to a VoD portal site and the VoD process is carried out (to be discussed later).

If the "d" button is operated on the remote controller ("Yes" in step S713), a "data_button_pressed" event is issued, and transition is made to the base point of the data broadcast content (top page "startup2.bml") that should be executed as the original data broadcast (step S714). What takes place following the transition to the original data broadcast screen was discussed above in reference to FIG. 4 and thus will not be explained further.

Upon receipt of a data event stemming from the operation of the "d" (or "Exit") button with the original data broadcast screen in effect ("Yes" in step S715), the data broadcast engine 242 terminates the data broadcast. Control is then returned to step S701, and the broadcast reception block 201 again performs the channel selection process.

In response to the "select" key getting operated on the remote controller ("Yes" in step S712), the receiving terminal 103 makes transition from the current screen to the VoD portal site. The data broadcast engine 242 then performs the process of displaying the portal screen for VoD reproduction (step S721).

If the user designates termination of the VoD portal screen by operating the remote controller, for example, step S702 is reached again, and the demultiplexer 203 performs the process of demultiplexing the multiplexed broadcast signal.

If, with the VoD portal screen displayed, the user designates reproduction of video content by means of the operation input block 206 such as the remote controller ("Yes" in step S723), a VoD reproduction process is carried out (step S724). In this case, the network connection block 202 acquires the designated video content via the Internet 104. The media reproduction processing part 243 performs the process of reproducing the acquired video content.

When the user designates termination of the VoD reproduction process ("Yes" in step S725) or when the VoD reproduction process comes to an end ("Yes" in step S726), step S721 is reached again and the data broadcast engine 242 carries out the process of displaying the portal screen for VoD reproduction.

Figure 8B:
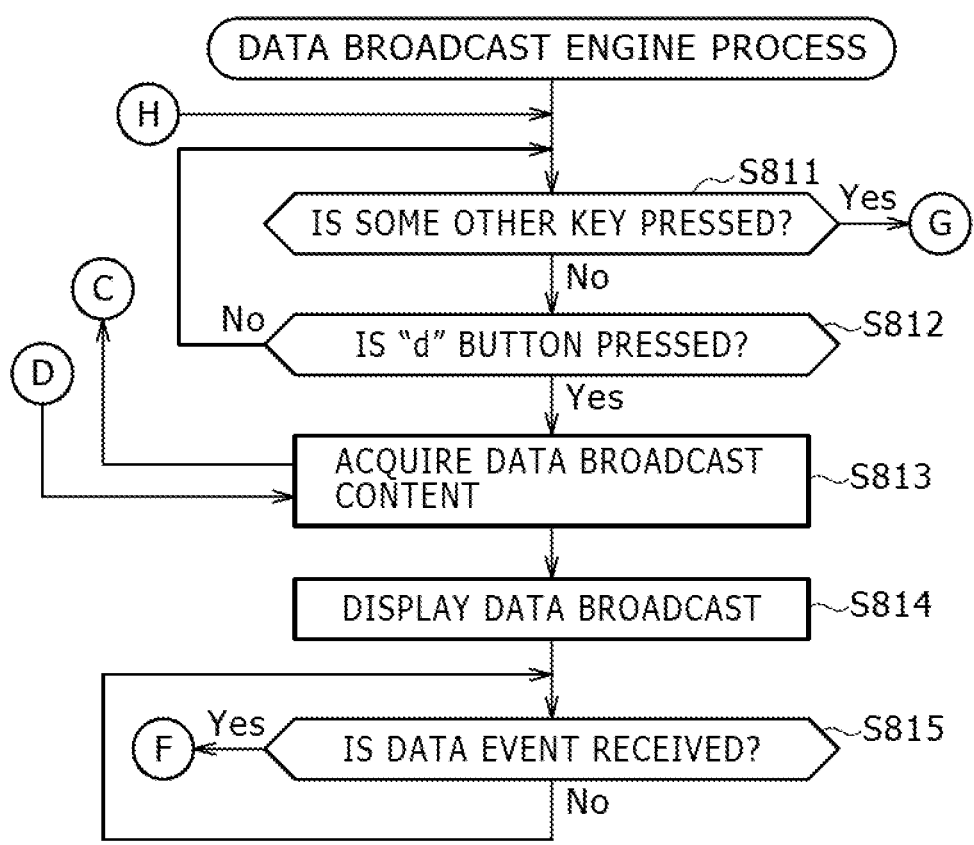
FIG. 8B is a flowchart showing another procedure (data broadcast process) performed by the receiving terminal when using the data broadcast service (when the pseudo-data broadcast content serving as the startup document is preinstalled in the receiving terminal)

FIGS. 8A through 8C show, in the form of flowcharts, the procedures to be performed by the receiving terminal 103 when the data broadcast service is utilized. In these examples, the pseudo-data broadcast content serving as the startup document is assumed to be preinstalled in the receiving terminal 103.

When the user starts viewing a TV program on the receiving terminal 103, the broadcast reception block 201 performs a channel selection process (step S801).

At the start of the TV program viewing, the data broadcast engine 242 reads the startup document preinstalled in the receiving terminal 103 and starts the data broadcast (step S802).

The demultiplexer 203 then demultiplexes the multiplexed broadcast signal (step S803). The media reproduction processing part 243 performs the process of reproducing the video and audio signals demultiplexed in step S803. This causes the display block 207 to display the resulting image on the screen and the speaker block 208 to output sounds (step S804).

At this point, if the user selects another channel by operating the channel buttons (CH+, CH−) on the remote controller ("Yes" in step S805), for example, step S701 is reached again and the broadcast reception block 201 again performs the channel selection process.

Steps S801 through S805 explained above are repeated until the receiving terminal 103 is powered off ("No" in step S806).

The data broadcast engine 242 starts the startup document in step S802. Here, the startup document is the pseudo-data broadcast content. As discussed above, what the pseudo-data broadcast content describes in script form regarding the function of the receiving terminal 103 triggered by remote controller operations is twofold: (1) operating the "d" button of the remote controller starts the data broadcast content that should originally be carried out as a data broadcast; and (2) operating a color key or the like other than the "d" button makes transition to a predetermined service site. Since the pseudo-data broadcast content is "transparent" BML content with no description about the format in which the data broadcast screen is to be represented, the full-screen display of the broadcast program reproduced and output in step S804 remains intact following the startup.

If the "select" button is operated on the remote controller ("Yes" in step S811), transition is made to the portal screen of a predetermined service site about which the link information is described in the pseudo-data broadcast content. In this case, it is assumed that transition is performed to a VoD portal site and the VoD process is carried out (to be discussed later).

If the "d" button is operated on the remote controller ("Yes" in step S812), a "data_button_pressed" event is issued. In response, the data broadcast engine 242 acquires the top page document "startup2.bml" that should be executed as the original data broadcast from the data broadcast (step S813), and makes transition to the original data broadcast screen (step S814). What takes place following the transition to the original data broadcast screen was discussed above in reference to FIG. 4 and thus will not be explained further.

Upon receipt of a data event stemming from the operation of the "d" (or "Exit") button with the original data broadcast screen in effect ("Yes" in step S815), the data broadcast engine 242 terminates the data broadcast. Control is then returned to step S701, and the broadcast reception block 201 again performs the channel selection process.

In response to the "select" key getting operated on the remote controller ("Yes" in step S811), the receiving terminal 103 makes transition from the current screen to the VoD portal. The data broadcast engine 242 then performs the process of displaying the portal screen for VoD reproduction (step S821).

If the user designates termination of the VoD portal screen by operating the remote controller, for example, step S802 is reached again, and the data broadcast engine 242 again starts the startup document preinstalled in the receiving terminal 103.

If, with the VoD portal screen displayed, the user designates reproduction of video content by means of the operation input block 206 such as the remote controller ("Yes" in step S823), a VoD reproduction process is carried out (step S824). In this case, the network connection block 202 acquires the designated video content via the Internet 104. The media reproduction processing part 243 then performs the process of reproducing the acquired video content.

When the user designates termination of the VoD reproduction process ("Yes" in step S825) or when the VoD reproduction process comes to an end ("Yes" in step S826), step S821 is reached again and the data broadcast engine 242 carries out the process of displaying the portal screen for VoD reproduction.

According to the above-described embodiment of this disclosure, by operating the data link button such as the "d" button while viewing a TV broadcast full-screen, the user may utilize the data broadcast screen as usual; the user does not experience any confusion. By operating a color key while viewing the TV broadcast full-screen, the user can make a direct transition to the portal screen of an Internet service. That is, starting from the currently viewed TV program, it is not necessary to go through the menu screen or the like specific to the TV set in use before making transition to the portal screen of the Internet service. Thus the user can make use of the Internet service seamlessly from viewing the TV program.

The technology disclosed in this specification may also be implemented as follows:

(1) A receiving apparatus including: a broadcast reception block configured to receive a broadcast signal in which data broadcast content is multiplexed; a network connection block configured to connect with a network; an operation input block configured to input operations made by a user operating a data link button and other keys or buttons, the data link button designating the linkage of broadcast content with the data broadcast content when operated; a display block; a broadcast content display block configured to display on the display block the broadcast content received by either the broadcast reception block or the network connection block; a network content processing block configured to process network content acquired via the network connection block before displaying the processed network content on the display block; a pseudo-data broadcast content processing block configured to process pseudo-data broadcast content having a first designation part and a second designation part, the first designation part designating activation of the data broadcast content accompanying the broadcast content in response to the operation of the data link button, the second designation part designating transition to a predetermined site on the network in response to the operation of any of the other keys or buttons, and a data broadcast content processing block configured to display a data broadcast screen on the display block by processing the data broadcast content accompanying the broadcast content.

(2) The receiving apparatus as described in paragraph (1) above, wherein the pseudo-data broadcast content is described in the same description language format as the data broadcast content accompanying the broadcast content.

(3) The receiving apparatus as described in paragraph (1) above, wherein the pseudo-data broadcast content does not include display information, and wherein, while the pseudo-data broadcast content processing block is processing the pseudo-data broadcast content, the broadcast content display block keeps displaying on the display block the broadcast content being viewed.

(4) The receiving apparatus as described in paragraph (1) above, wherein the pseudo-data broadcast content processing block processes the pseudo-data broadcast content acquired via either the broadcast reception block or the network connection block.

(5) The receiving apparatus as described in paragraph (1) above, wherein the pseudo-data broadcast content processing block processes the pseudo-data broadcast content preinstalled in the receiving apparatus.

(6) The receiving apparatus as described in paragraph (1) above, wherein the pseudo-data broadcast content is set as a startup document for starting a data broadcast, and wherein, when the broadcast signal received by the broadcast reception block includes a system descriptor designating automatic activation of the data broadcast, the pseudo-data broadcast content processing block starts the processing of the pseudo-data broadcast content.

(7) A display control method including: displaying display content that has been received; processing pseudo-data broadcast content having a first designation part and a second designation part, the first designation part designating activation of data broadcast content accompanying broadcast content in response to the operation of a data link button, the second designation part designating transition to a predetermined site on a network in response to the operation of any of other keys or buttons; displaying a data broadcast screen by processing the data broadcast content accompanying the broadcast content in response to the operation of the data link button, and making transition to a portal screen of a predetermined site on the network in response to the operation of any of the other keys or buttons.

(8) A broadcasting system including a broadcast station and a receiving station, the broadcast station broadcasting a broadcast signal in which data broadcast content is multiplexed, the receiving station receiving the broadcast signal; wherein the receiving station acquires pseudo-data broadcast content having a first designation part and a second designation part, the first designation part designating activation of the data broadcast content accompanying broadcast content in response to the operation of a data link button, the second designation part designating transition to a predetermined site on a network in response to the operation of any of other keys or buttons; wherein the receiving station starts processing of the pseudo-data broadcast content when the broadcast station starts a data broadcast; wherein, in response to the operation of the data link button, the receiving station displays a data broadcast screen by processing the data broadcast content accompanying the broadcast content, and wherein, in response to the operation of any of the other keys or buttons, the receiving station makes transition to a portal screen of a predetermined site on the network.

(9) A computer program described in a computer-readable format for causing a computer to function as an apparatus including: a broadcast reception block configured to receive a broadcast signal in which data broadcast content is multiplexed; a network connection block configured to connect with a network; an operation input block configured to input operations made by a user operating a data link button and other keys or buttons, the data link button designating the linkage of broadcast content with the data broadcast content when operated; a display block; a broadcast content display block configured to display on the display block the broadcast content received by either the broadcast reception block or the network connection block; a network content processing block configured to process network content acquired via the network connection block before displaying the processed network content on the display block; a pseudo-data broadcast content processing block configured to process pseudo-data broadcast content having a first designation part and a second designation part, the first designation part designating activation of the data broadcast content accompanying the broadcast content in response to the operation of the data link button, the second designation part designating transition to a predetermined site on the network in response to the operation of any of the other keys or buttons, and a data broadcast content processing block configured to display a data broadcast screen on the display block by processing the data broadcast content accompanying the broadcast content.

It is to be understood that while the technology disclosed in this specification has been described in detail in conjunction with specific embodiments and examples, it is evident that many alternatives, modifications and variations will become apparent to those skilled in the art in light of the foregoing description.

The technology disclosed in this specification may be applied to diverse broadcasting systems including ground, satellite, cable TV, and IPTV systems offering data broadcasting services.

Although the video-on-demand portal site was cited above as one typical portal site of Internet services which are made available commonly to different broadcast stations and to which direct transition is made from the data broadcast screen of the TV set or the like, this is not limitative of the technology disclosed in this specification.

Thus the specificities contained in this specification should not be construed as limiting the scope of the disclosure but as merely providing illustrations of some of the presently preferred embodiments of this disclosure. Accordingly, the scope of the disclosure should be determined by the appended claims and their legal equivalents, rather than by the examples given.

It should be understood by those skilled in the art that various modifications, combinations, sub-combinations and alterations may occur depending on design requirements and other factors in so far as they are within the scope of the appended claims or the equivalents thereof.

What is claimed is:

1. A receiving apparatus comprising:
a broadcast reception block configured to receive a broadcast signal in which data broadcast content is multiplexed;
a network connection block configured to connect with a network;
an operation input block configured to input operations made by a user operating a data link button and other keys or buttons, said data link button designating a linkage of broadcast content with the data broadcast content when operated;
a display block;
a broadcast content display block configured to display on said display block the broadcast content received by either said broadcast reception block or said network connection block;
a network content processing block configured to process network content acquired via said network connection block before displaying the processed network content on said display block;

a pseudo-data broadcast content processing block configured to process pseudo-data broadcast content having a first designation part and a second designation part, said first designation part designating activation of the data broadcast content accompanying the broadcast content in response to the operation of said data link button, said second designation part designating direct transition to a respective predetermined site on said network in response to the operation of a selected one of said other keys or buttons; and a data broadcast content processing block configured to display a data broadcast screen on said display block by processing the data broadcast content accompanying the broadcast content, in which said second designation part causes the broadcast content received by said broadcast reception block to be displayed on said display block as a full screen image after activation of the data broadcast content accompanying the broadcast content has been designated in response to the operation of said data link button and thereafter, and in response to the selected one of said other keys or buttons being operated, the respective predetermined site on said network is directly accessed without having to go through an intermediate screen and is displayed on said display block as a full screen image.

2. The receiving apparatus according to claim 1, wherein said pseudo-data broadcast content is described in a same description language format as the data broadcast content accompanying the broadcast content.

3. The receiving apparatus according to claim 2, in which the description language format is BML (Broadcast Markup Language).

4. The receiving apparatus according to claim 1, wherein said pseudo-data broadcast content does not include display information, and while said pseudo-data broadcast content processing block is processing said pseudo-data broadcast content, said broadcast content display block keeps displaying on said display block the broadcast content being viewed.

5. The receiving apparatus according to claim 1, wherein said pseudo-data broadcast content processing block processes the pseudo-data broadcast content acquired via either said broadcast reception block or said network connection block.

6. The receiving apparatus according to claim 1, wherein said pseudo-data broadcast content processing block processes the pseudo-data broadcast content preinstalled in said receiving apparatus.

7. The receiving apparatus according to claim 1, wherein said pseudo-data broadcast content is set as a startup document for starting a data broadcast, and when the broadcast signal received by said broadcast reception block includes a system descriptor designating automatic activation of the data broadcast, said pseudo-data broadcast content processing block starts the processing of said pseudo-data broadcast content.

8. The receiving apparatus according to claim 1, in which the intermediate screen is a menu screen.

9. The receiving apparatus according to claim 1, in which the intermediate screen is a proprietary screen of a manufacturer of the receiving apparatus.

10. A display control method comprising:

displaying display broadcast content that has been received;

processing pseudo-data broadcast content having a first designation part and a second designation part, said first designation part designating activation of data broadcast content accompanying the broadcast content in response to the operation of a data link button, said second designation part designating transition to a respective predetermined site on a network in response to the operation of a selected one of other keys or buttons;

displaying a data broadcast screen by processing the data broadcast content accompanying the broadcast content in response to the operation of said data link button; and making direct transition to a portal screen of the respective predetermined site on said network in response to the operation of the selected one of said other keys or buttons, in which said second designation part causes the received broadcast content to be displayed on a display as a full screen image after activation of the data broadcast content accompanying the broadcast content has been designated in response to the operation of said data link button and thereafter, and in response to the selected one of said other keys or buttons being operated, the portal screen of the respective predetermined site on said network is directly accessed without having to go through an intermediate screen and is displayed on said display as a full screen image.

11. A broadcasting system comprising a broadcast station and a receiving station, said broadcast station broadcasting a broadcast signal in which data broadcast content is multiplexed, said receiving station receiving said broadcast signal; wherein said receiving station acquires pseudo-data broadcast content having a first designation part and a second designation part, said first designation part designating activation of the data broadcast content accompanying broadcast content in response to the operation of a data link button, said second designation part designating transition to a respective predetermined site on a network in response to the operation of a selected one of other keys or buttons, said receiving station starts processing of said pseudo-data broadcast content when said broadcast station starts a data broadcast, in response to the operation of said data link button, said receiving station displays a data broadcast screen by processing the data broadcast content accompanying the broadcast content, and in response to the operation of the selected one of said other keys or buttons, said receiving station makes direct transition to a portal screen of the respective predetermined site on said network, in which said second designation part causes the broadcast content received by said receiving station to be displayed on a display as a full screen image after activation of the data broadcast content accompanying the broadcast content has been designated in response to the operation of said data link button and thereafter, and in response to the selected one of said other keys or buttons being operated, the respective predetermined site on said network is directly accessed without having to go through an intermediate screen and is displayed on said display as a full screen image.

12. A non-transitory computer readable memory having stored thereon a computer program described in a computer-readable format for causing a computer to function as an apparatus comprising:

a broadcast reception block configured to receive a broadcast signal in which data broadcast content is multiplexed;

a network connection block configured to connect with a network;

an operation input block configured to input operations made by a user operating a data link button and other keys or buttons, said data link button designating the linkage of broadcast content with the data broadcast content when operated;

a display block;

a broadcast content display block configured to display on said display block the broadcast content received by either said broadcast reception block or said network connection block;

a network content processing block configured to process network content acquired via said network connection block before displaying the processed network content on said display block;

a pseudo-data broadcast content processing block configured to process pseudo-data broadcast content having a first designation part and a second designation part, said first designation part designating activation of the data broadcast content accompanying the broadcast content in response to the operation of said data link button, said second designation part designating direct transition to a respective predetermined site on said network in response to the operation of a selected one of said other keys or buttons; and a data broadcast content processing block configured to display a data broadcast screen on said display block by processing the data broadcast content accompanying the broadcast content, in which said second designation part causes the broadcast content received by said broadcast reception block to be displayed on said display block as a full screen image after activation of the data broadcast content accompanying the broadcast content has been designated in response to the operation of said data link button and thereafter, and in response to the selected one of said other keys or buttons being operated, the respective predetermined site on said network is directly accessed without having to go through an intermediate screen and is displayed on said display block as a full screen image.

* * * * *